United States Patent Office 3,372,173
Patented Mar. 5, 1968

3,372,173
SELENO-SUBSTITUTED STEROID COMPOUNDS
Albert Segaloff, Metairie, and Richard Bruce Gabbard, New Orleans, La., assignors to the United States of America
No Drawing. Filed June 3, 1965, Ser. No. 461,213
17 Claims. (Cl. 260—397.3)

ABSTRACT OF THE DISCLOSURE

Steroid compounds having a seleno-substituent at the 3-position, which exhibit androgenic activity, and a method of making the same. In the method, a 3-hydroxysteroid is converted to its p-toluenesulfonate ester in any convenient manner such as by reaction with p-toluenesulfonyl chloride in the presence of an acid acceptor. The p-toluenesulfonate ester is then refluxed with selenourea to produce a steroidal selenopseudourea salt of p-toluenesulfonic acid. The steroidal selenopseudourea salts are hydrolyzed in basic solution and oxidized to diselenides or stabilized as an ester by a Schotten-Baumann recation. The specific steroids used were dehydroepiandrosterone and pregnenolone.

---

This invention relates to steroid compounds. In one specific aspect, it relates to novel seleno-substituted steroid compounds.

The steroids constitute a recognized class of compounds having a substituted tetracyclic perhydrocyclopenta[a]phenanthrene nucleus. Typical steroids exhibit several of the following general characteristics: the presence of some degree of unsaturation in the molecule, the presence of angular methyl groups at the 10- and 13-positions, the presence of a side chain at the 17-position, and the presence of an oxygen function such as hydroxy or keto at the 3-, 17- and/or 20-positions. Many of these steroids occur in nature and possess important physiological activities.

Conventional numbering of the positions in steroid compounds is illustrated by means of 3β-hydroxypregn-5-en-20-one, more commonly known as pregnenolone. The geometric or cis-trans configuration of the compound is not shown in the formula given below:

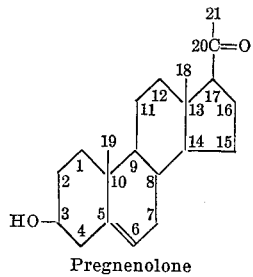

Pregnenolone

The novel compounds of the present invention are steroid compounds having a seleno-substituent at the 3-position. These compounds exhibit androgenic activity and display some ability to antagonize testosterone in both the rat and the chick.

The starting materials for the preparation of the novel seleno-steroids of the present invention are the corresponding 3-hydroxy-steroid compounds. The 3-hydroxy-steroid starting material is converted to its p-toluenesulfonate (tosylate) ester in any convenient manner. This is most usually accomplished by reaction of the hydroxy-steroid with p-toluenesulfonyl chloride in the presence of an acid acceptor. Letting R— symbolize the 3-steroid radical, the tosylate would be written as

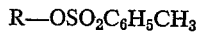

Refluxing of the tosylate ester with selenourea in alcoholic solution results in the introduction of selenium at the 3-position of the steroid. After refluxing for about 15–45 minutes, the steroidal selenopseudourea precipitates from solution as its salt with p-toluenesulfonic acid. The pseudourea salt may be symbolized as having the formula

The resultant steroidal pseudourea salts are readily hydrolyzed in basic solution. Because of their rapid autooxidation to diselenides, the 3-selenols resulting on hydrolysis were not isolated. When it is desired to prepare the diselenides, solvolysis with an organic amine is preferred as the basis for the method.

The 3-selenols can be stabilized in the form of their esters. This is accomplished most conveniently by the in situ Schotten-Baumann esterification of the 3-selenols as they are liberated on alkaline hydrolysis. A reducing agent, such as sodium borohydride, is added to inhibit oxidation of the selenols to the diselenides. Reduction of the diselenides under Schotten-Baumann conditions should also result in the formation of the 3-steroidal selenoester. The benzoate ester is symbolized as

Our invention is further illustrated by means of the following examples:

Example I

About 50 ml. of ethyl alcohol containing 8.8 grams of dehydroepiandrosterone tosylate and 4.9 grams of selenourea was refluxed until a solid product precipitated. The reaction mixture was allowed to cool and the product was separated by filtration. Recrystallization from glacial acetic acid gave 3.4 grams of pure 2-(17-oxoandrost-5-en-3β-yl)-2-selenopseudourea p-toluene sulfonate melting 254–255° C. The product analyzed as follows: C, 57.75%; H, 6.79% and N, 4.69%. Calculated for $C_{27}H_{38}N_2O_4SeS$: C, 57.34%; H, 6.77% and N, 4.95%.

Example II

Using the method of Example I, 9.4 grams of pregnenolone tosylate was reacted with selenourea in alcoholic solution. There was obtained 5.8 grams of pure 2-(20-oxopregn-5-en-3β-yl)-2-selenopseudourea p - toluenesulfonate melting 249–250° C. The product analyzed as follows: C, 58.85%; H, 7.24%; and N, 4.78%. Calculated for $C_{29}H_{42}N_2O_4SeS$: C, 58.67%; H, 7.13%; and N, 4.72%.

Example III

About 20 ml. of pyrrolidine was mixed for about one minute with 4.0 grams of 2-(17-oxoandrost-5-en-3β-yl)-2-selenopseudourea p-toluenesulfonate from Example I. About 50 ml. of alcohol was then added and the solid product separated by filtration. After recrystallization from dichloromethane-ethanol, there was obtained 1.4 grams of 3β,3β'-diseleno-bis-(androst-5-en-17-one) as yellow plates melting 247–248° C. The product analyzed as follows: C, 65.01%; H, 7.57%. Calculated for $C_{38}H_{54}O_2Se_2$: C, 65.14%; H, 7.77%.

Example IV

Using the method of Example III, 4.0 grams of 2-(20-oxopregn-5-en-3β-yl)-2-selenopseudourea p - toluenesulfonate from Example II yielded 1.5 grams of 3β,3β'-diseleno-bis-(pregn-5-en-20-one) as yellow plates melting 172–174° C. The product analyzed as follows: C, 66.78%; H, 8.09%. Calculated for $C_{42}H_{62}O_2Se_2$: C, 66.65%; H, 8.26%.

Example V

To about 4.0 grams of 2-(17-oxoandrost-5-en-3β-yl)-2-selenopseudourea p-toluenesulfonate from Example I in 30 ml. of ethyl alcohol at about 5° C. there was added with stirring and in one portion 10 ml. of water containing 0.4 gram of potassium hydroxide and 0.2 gram of sodium borohydride. A 4 ml. portion of benzoyl chloride was added all at once to the stirred reaction mixture as soon as it became homogeneous. The solid product was collected by filtration and washed with aqueous alcohol. After recrystallization from dichloromethane-alcohol, there was obtained 3β-selenylandrost-5-en-17-one benzoate melting 226–229° C.

*Example VI*

Using the method of Example V with 2-(20-oxopregn-5-en-3β-yl) - 2 - selenopseudourea p - toluenesulfonate from Example II gave 3β-selenylpregn-5-en-20-one benzoate melting 218–221° C.

The following biological assay methods were employed in order to test representative compounds of the present invention for androgenic activity and the ability to antagonize testosterone:

For assay in the chicken, two-day-old, single-comb white Leghorn cockerels were employed. The test steroids were dissolved in mineral oil and then diluted with 99 volumes of ethyl ether. The ethereal solutions in 0.05 ml. doses were applied to the chicks' combs with an 0.25 ml. tuberculin syringe and 27 gauge needle each day for 7 days. Dosage of the test steroid was 10 or 100 gamma daily. The chicks were sacrificed with ether 48 hours after the last application. They were weighed and the combs excised with a standard 6-inch blunt operating scissors applied as closely as possible to the skull. To assay the anti-androgenic effects of the test steroids, either local applications of testosterone (1 gamma) plus separate local applications of the test steroid were used; or a single intramuscular injection of 0.5 mg. of testosterone enanthate was given initially and then the test steroid was applied locally to the combs. The test steroids were administered locally to the combs as described above. Comparison with the controls gave an index of the biological activity demonstrated by the test steroids.

For assay in the rat, immature male rats of the homozygous Fischer strain were employed. Rats weighing 45–55 were castrated while anesthetized with ether. On the same day, they received the first of 7 daily injections, at dosage rates of 100 gamma or 1 mg. daily of the test steroid. The steroids were administered subcutaneously in 0.2 ml. of sesame oil; the test steroid and testosterone (1 gamma) were injected separately at different sites. When oral administration was evaluated, the assay method was the same as that described except that the steroid dissolved in 0.2 ml. of sesame oil was given by gavage. After the last injection, the rats were sacrificed wih ether and the ventral prostate, right seminal vesicles and levator ani muscles dissected out and weighed. Comparison with the controls gave an index of the biological activity demonstrated by the test steroids.

Using the assays described above, the compounds of the examples exhibited androgenic activity and some ability to inhibit testosterone. In addition, 3β,3β'-diseleno-bis-(androst-5-en-17-one) inhibited the effect of progesterone on the rabbit endometrium.

We claim:
1. Pregnenolone having a seleno-substituent at the 3-position.
2. Dehydroepiandrosterone having a seleno-substituent at the 3-position.
3. 2-(20-oxopregn-5-en-3β-yl)-2 - selenopseudourea p-toluenesulfonate.
4. 3β,3β'-diseleno-bis-(pregn-5-en-20-one).
5. 3β-selenylpregn-5-en-20-one benzoate.
6. 2-(17-oxoandrost-5-en-3β-yl)-2-selenopseudourea p-toluenesulfonate.
7. 3β,3β'-diseleno-bis-(androst-5-en-17-one).
8. 3β-selenylandrost-5-en-17-one benzoate.
9. A method of making a 3-steroidal selenopseudourea p-toluenesulfonate which comprises reacting by heating the p-toluenesulfonate ester of the corresponding 3-hydroxy-steroid selected from the group consisting of pregnenolone and dehydroepiandrosterone with selenourea in the presence of a suitable solvent.
10. A method according to claim 9 wherein the 3-hydroxy-steroid is pregnenolone.
11. A method according to claim 9 wherein the 3-hydroxy-steroid is dehydroepiandrosterone.
12. A method of making a bis-3-steroidal diselenide of a steroid selected from the group consisting of pregnenolone and dehydroepiandrosterone which comprises hydrolyzing the corresponding 3-steroidal selenopseudourea p-toluenesulfonate in an alkaline solution.
13. A method according to claim 12 wherein the 3-steroidal selenopsuedourea p-toluenesulfonate is 2-(20-oxopregn-5-en-3β-yl)-2-selenopseudourea p - toluenesulfonate.
14. A method according to claim 12 wherein the 3-steroidal selenopseudourea p-toluenesulfonate is 2-(17-oxoandrost-5-en-3β-yl)-2-selenopseudourea p - toluenesulfonate.
15. A method of making a 3-steroidal seleno-ester of a steroid selected from the group consisting of pregnenolone and dehydroepiandrosterone which comprises hydrolyzing the corresponding 3-steroidal selenopseudourea p-toluenesulfonate salt in an alkaline solution in the presence of a reducing agent and an acid chloride.
16. A method of making 3β-selenylpregn-5-en-20-one benzoate which comprises hydrolyzing 1-(20-oxopregn-5-en-3β-yl)-2-selenopseudourea p-toluenesulfonate in an alkaline solution in the presence of a reducing agent and a benzoyl chloride.
17. A method of making 3β-selenylandrost-5-en-17-one benzoate which comprises hydrolyzing 2-(17-oxoandrost-5-en-3β-yl)-2-selenopseudourea p-toluenesulfonate in an alkaline solution in the presence of a reducing agent and a benzoyl chloride.

References Cited
UNITED STATES PATENTS 2,375,874  5/1945  Rosenberg et al. ____ 260—397.2
3,117,140  1/1964  Hecker _____ 260—397.4

LEWIS GOTTS, *Primary Examiner.*

J. R. BROWN, *Assistant Examiner.*